Nov. 15, 1949 C. N. KIMBERLIN, JR., ET AL 2,488,128
PREPARATION OF SILICA MICROSPHERE
SUPPORTED IRON GROUP CATALYST
Filed Dec. 29, 1945
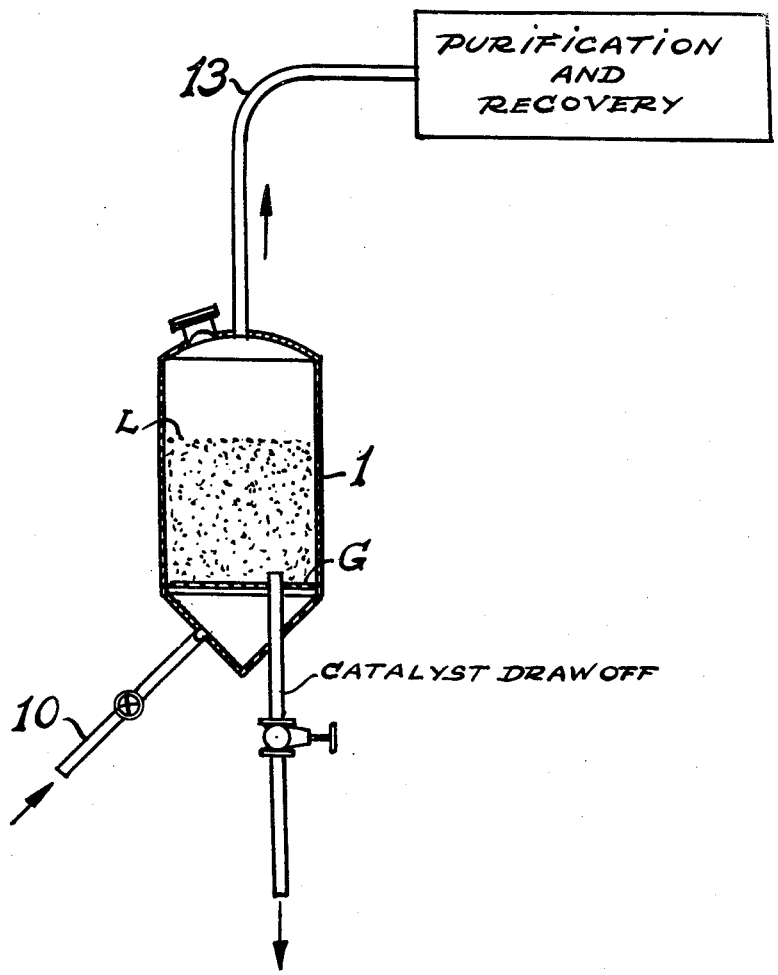
Robert E. Schexnailder Jr.
Charles N. Kimberlin Jr. Inventors
By J. C. Arnall Attorney Patented Nov. 15, 1949

2,488,128

UNITED STATES PATENT OFFICE 2,488,128

PREPARATION OF SILICA MICROSPHERE SUPPORTED IRON GROUP CATALYST

Charles N. Kimberlin, Jr., Baton Rouge, and Robert E. Schexnailder, Jr., Hope Villa, La., assignors to Standard Oil Development Company, a corporation of Delaware Application December 29, 1945, Serial No. 638,419

4 Claims. (Cl. 252—448)

Many novel features of our invention are disclosed in the following specification and claims, including the accompanying drawing forming a part of the specification.

Our present invention relates to improvements in the synthesis of hydrocarbons from carbon monoxide and hydrogen, and in particular it relates to improvements in the catalyst employed in this type of operation.

Heretofore and prior to our invention the synthesis of hydrocarbons including those boiling in the gasoline and gas oil range, was a matter of record and some commercial practice, at least in countries foreign to the United States. In so far as we are aware, the catalyst used in the prior processes was a metal selected from group VIII of the periodic system sometimes used, as in the case of iron, as such, and sometimes, as in the case of cobalt, supported on a suitable carrier such as kieselguhr. In brief, our present improvements as indicated relate to improvements in the process by employing an improved catalyst, and more particularly, improving the support for the active catalytic material. The support or spacing agent which we propose to use is silica gel specially prepared as will hereinafter more fully appear.

In the accompanying drawing we have shown diagrammatically by means of a diagram merely those portions of a hydrocarbon synthesis unit which are necessary to illustrate a preferred modification of our invention by omitting conventional accessory apparatus in the interest of clarity.

The main object of our invention, therefore, is to provide means for synthesizing hydrocarbons from carbon monoxide and hydrogen by providing a catalyst of improved activity for the reaction.

More specifically, the object of our invention is to provide a supported catalyst in which the support is a highly absorbent material, adapted to retain the active catalytic component, and furthermore adapted to resist physical disintegration in use in a fluid type operation.

Other and further objects of the invention will appear from the following more detailed description and claims.

Referring in detail to the drawing, where we have shown a preferred improvement of our invention, 1 represents a reaction case comprising essentially a cylindrical shell having disposed therein a screen or grid G and a mass of powdered catalytic material. In operating the process which we have chosen to illustrate our invention, a mixture of carbon monoxide and hydrogen enters the system through line 10 and is thereafter forced upwardly through the mass of powdered catalyst in the reactor at a superficial velocity of 0.2 to 3 feet per second, whereupon the catalyst is caused to be formed into a dense suspension, which dense suspension, depending on the actual number of pounds of catalyst in the reaction zone, will have an upper dense phase level at L, above which there is a dilute phase. The proper conditions of temperature and pressure and feed rate are maintained within the reaction zone to obtain the desired reaction and conversion and thereafter the product is withdrawn from the reactor through a line 13. There is disposed in the upper portion of the reactor several solids-gas contacting devices (not shown) through which the suspension is forced in order to separate catalyst fines and entrained coarser catalyst, and thereafter vapors issue through line 13 and are delivered to conventional recovery and purification equipment, including, of course, fractional distillation apparatus and similar oil refinery apparatus and utilities. It should be pointed out also that ordinarily in the usual practice, the vapors in line 13 are forced through one or more electrical precipitators for the purpose of separating as much of the remaining traces of catalyst as can be so separated in equipment not illustrated in the drawing. The foregoing is a brief description of conventional and previously known, at least on experimental scale, equipment employed for synthesizing hydrocarbons using so-called fluid catalyst technique. We do not intend to limit our operation to this type of process for the same may be employed using the old stationary type beds of catalyst, but as those in the art will understand, the newer fluid catalyst technique possesses many desirable attributes such as the maintenance of substantially uniform temperatures in the reaction zone due to the turbulent, ebullient nature of the dense suspension and the thorough mixing of catalyst which is incident thereto, as well as the increased facility with which catalyst may be withdrawn from a reactor, cooled and returned thereto to maintain the temperature conditions in the reactor at desired levels. As previously indicated, however, the novel feature of our invention relates to the use of a highly active catalyst and we shall set forth below specific examples describing methods for preparing this catalyst.

*Example 1*

A silica hydrosol was prepared by mixing with stirring 6 gallons of sulphuric acid having a specific gravity of 1.19 with 6 gallons of sodium silicate having a specific gravity of 1.21 at room temperature. The acid was added to the silicate during a period of 5 minutes. The hydrosol was suspended by agitation in 160 gallons of mineral oil containing 16 cc. of an emulsifier (Alkerterge—O, obtained from Commercial Solvents Corp.) at a temperature of 160° F. The suspension was maintained by agitation for 30 minutes, at which time the hydrosol had been converted into a hydrogel in the form of microspheres. The latter were transferred from the oil to water and washed with water till free of sodium and sulphate ions. Fifty pounds of the resulting silica hydrogel in the form of microspheres containing 10% silica were suspended in 21.5 litres of butanol. The mixture of butanol and silica gel microspheres was subjected to a distillation, water and butanol appearing in the distillate. The latter, that is to say the condensed butanol, was returned to the still. After the water had been removed by distillation, the butanol was removed from the gel by heating the latter in a steam oven at a temperature of approximately 260° F. The thus dried gel was impregnated with a solution of cobalt, nickel, and thorium nitrates in sufficient quantity to give a final material after decomposition of the nitrates by heating to a temperature of 420° F. for a period of about 16 hours, containing 28.2% cobalt oxide (CoO), 5.6% thorium oxide ($ThO_2$) and 0.15% nickel oxide (NiO). Thereafter the oxides of the said metals were reduced with hydrogen at a temperature of from 650 to 700° F. until the gas from the reduction zone was substantially free of water vapor.

*Example 2*

The catalyst prepared according to Example 1 was then tested in the following manner:

A synthesis gas consisting of 2 mols of hydrogen per mol of carbon monoxide was passed over the catalyst at 390° F. at a feed rate of 100 volumes of synthesis gas per volume of catalyst per hour. The product which was collected contained approximately 160 cubic centimeters of liquid hydrocarbons per cubic meter of synthesis gas (measured at 32° F. and 1 atmosphere pressure).

*Example 3*

A portion of silica hydrogel microspheres as described in Example 1 was suspended in a petroleum cut of boiling range 300–400° F. The mixture was subjected to distillation to remove the water contained in the gel. After the water was removed most of the naphtha was separated by filtration and the remainder removed from the silica gel by heating in a steam oven. The thus dried gel was impregnated with a solution of cobalt, thorium and nickel nitrates in quantity sufficient to give after decomposition of the nitrates by heating and reduction in hydrogen a composition containing 36.1% cobalt, 5.1% thorium and 0.1% nickel.

This catalyst upon testing for the synthesis reaction under the conditions outlined in Example 2 gave only 103 cc. of liquid hydrocarbons per cubic meter of synthesis gas.

*Example 4*

A portion of silica hydrogel microspheres prepared as described in Example 1 was dried in a steam-heated oven. The thus dried gel was impregnated with a solution of cobalt, thorium, and nickel nitrates in quantity sufficient after decomposition of the nitrates and reduction of the oxides to give a composition of 32% cobalt, 5% thorium and 0.1% nickel.

This catalyst when tested for the hydrocarbon synthesis reaction under conditions described in Example 2 gave only 73 cc. of liquid hydrocarbons per cubic meter of synthesis gas.

It is to be understood that the foregoing examples illustrate our invention but do not impose any limitation thereon, and consequently the proportions of the various ingredients may be varied somewhat.

While the foregoing examples relate to the incorporation of cobalt as the main active component of the catalyst, it is to be understood that our improvements relate also to entirely analogous methods incorporating, say, iron or some other active hydrocarbon synthesis catalyst into silica gel; that is to say, we may impregnate a water-soluble salt of iron on the butanol dried gel.

In other words, our improvements apply to any previously known silica gel supporting hydrocarbon synthesis catalyst where the silica gel is prepared according to the methods hereinbefore set forth. That is to say, the proportion of cobalt or iron may vary from 20 to 40% and that of the promoter (e. g., thorium oxide or alkali metal salt) may vary from 1 to 10%. With respect to the synthesis reaction, the same need not necessarily be performed at 390° F. for, according to known procedure, this temperature may vary from 350° F. to 450° F., in the case where cobalt is the catalyst, and from 475° F. to 600° F. in the case of iron catalyst. Also the feed rate of synthesis gas to the reactor may be varied considerably. In the specific example we have set forth the hydrogen-carbon monoxide ratio in the feed gas entering the reactor was 2 mols of hydrogen per mol of carbon monoxide, but we wish to point out that other ratios of hydrogen and carbon monoxide may be employed such as ratios of 1–2 mols of hydrogen per mol of carbon monoxide in the feed gas.

Instead of using butanol, we may use amyl alcohol to wash the hydrogel. In any event, of course, it is necessary in the interest of economy to recover the alcohol for further use in the process. With certain precautions we may use other alcohols such as ethyl alcohol, propyl alcohol, isopropyl alcohol, secondary butyl alcohol or tertiary butyl alcohol, the precautions to be observed including the addition of a small amount (say 5 volume per cent) of benzene or other entrainer to the aqueous alcohol mixture recovered from the washing step, so that when the said mixture is subjected to distillation to concentrate the alcohol, the distillate recovered from the distillation is relatively free of water.

To recapitulate briefly, we have found that an improved catalyst composition may be made by impregnating or otherwise incorporating an active hydrocarbon synthesis catalyst into silica gel. The advantages of silica gel as a carrier are: (1) that silica gel may be ground to the proper size for use in a fluid operation; (2) that the silica gel is adapted to retain the active hydrocarbon synthesis catalyst which is impregnated or otherwise incorporated therein without having the active component separated from the carrier as is the case in other supports; and (3) that the silica gel is adapted to resist physical disintegration so that even after continued use in the fluid type of operation, it will substantially retain its original average particle size.

Numerous modifications of our invention will appear to those familiar with the art.

What we claim is:

1. A method of preparing fluidizable catalyst for the synthesis of hydrocarbons from a mixture of carbon monoxide and hydrogen which comprises suspending a silica hydrosol in a hydrocarbon oil, agitating the suspension until microspheres of silica hydrogel are formed, separating said hydrogel from said oil, washing said hydrogel with water, thereafter washing the hydrogel with a monohydric low molecular weight alcohol, heating the mixture to remove water and alcohol, impregnating the thus dried gel with a water-soluble salt solution of a metal of the iron group and a water-soluble salt of a promoter, heating the impregnated gel, treating the thus heat-treated impregnated gel with a normally gaseous reducing agent, and recovering therefrom a mass of catalyst particles of fluidizable size.

2. The method of claim 1 in which said alcohol is butanol.

3. The method of claim 1 in which the dried silica gel is impregnated with a mixture of cobalt, thorium and nickel nitrates.

4. The method of claim 1 in which the oxides of cobalt, thorium and nickel are reduced by treatment with hydrogen at temperatures within the range of from about 650 to 700° F.

CHARLES E. KIMBERLIN, Jr.
ROBERT E. SCHEXNAILDER, Jr.

REFERENCES CITED

The following references are of record in the file of this patent:

UNITED STATES PATENTS

| Number | Name | Date |
|---|---|---|
| 1,775,366 | Joseph | Sept. 9, 1930 |
| 2,244,196 | Herbert | June 3, 1941 |
| 2,347,682 | Gunness | May 2, 1944 |
| 2,360,787 | Murphree et al. | Oct. 17, 1944 |
| 2,384,946 | Marisic | Sept. 18, 1945 |
| 2,385,217 | Marisic | Sept. 18, 1945 |
| 2,429,751 | Gohr et al. | Oct. 28, 1947 |

FOREIGN PATENTS

| Number | Country | Date |
|---|---|---|
| 553,736 | Great Britain | June 3, 1943 |